July 14, 1953
B. R. HALPERN
2,645,153
OPTICALLY TRUE SUPPORT FOR PHOTOGRAPHIC
FILM, COPY OR OTHER MATERIAL
Original Filed Dec. 13, 1947
3 Sheets-Sheet 1
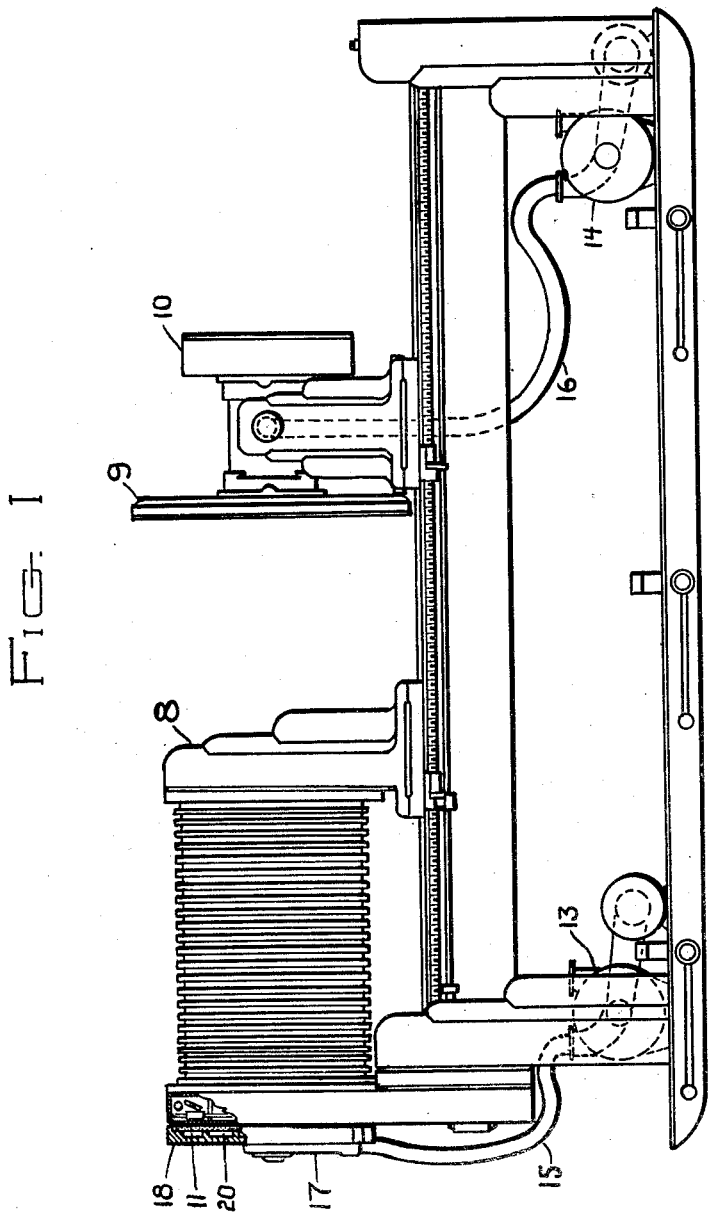
BERNARD R. HALPERN
*INVENTOR.*
BY July 14, 1953
B. R. HALPERN
2,645,153
OPTICALLY TRUE SUPPORT FOR PHOTOGRAPHIC
FILM, COPY OR OTHER MATERIAL
Original Filed Dec. 13, 1947
3 Sheets-Sheet 2
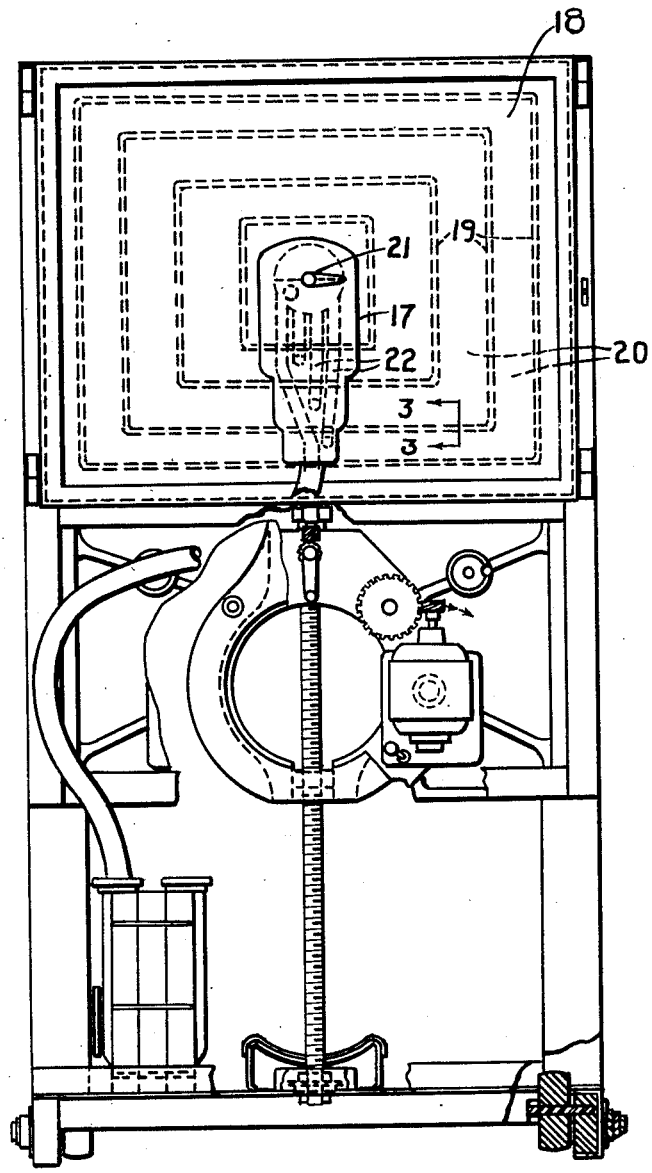
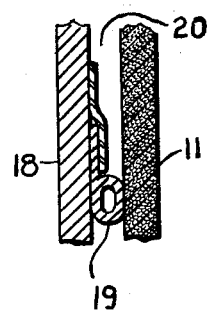
BERNARD R. HALPERN
INVENTOR.
BY

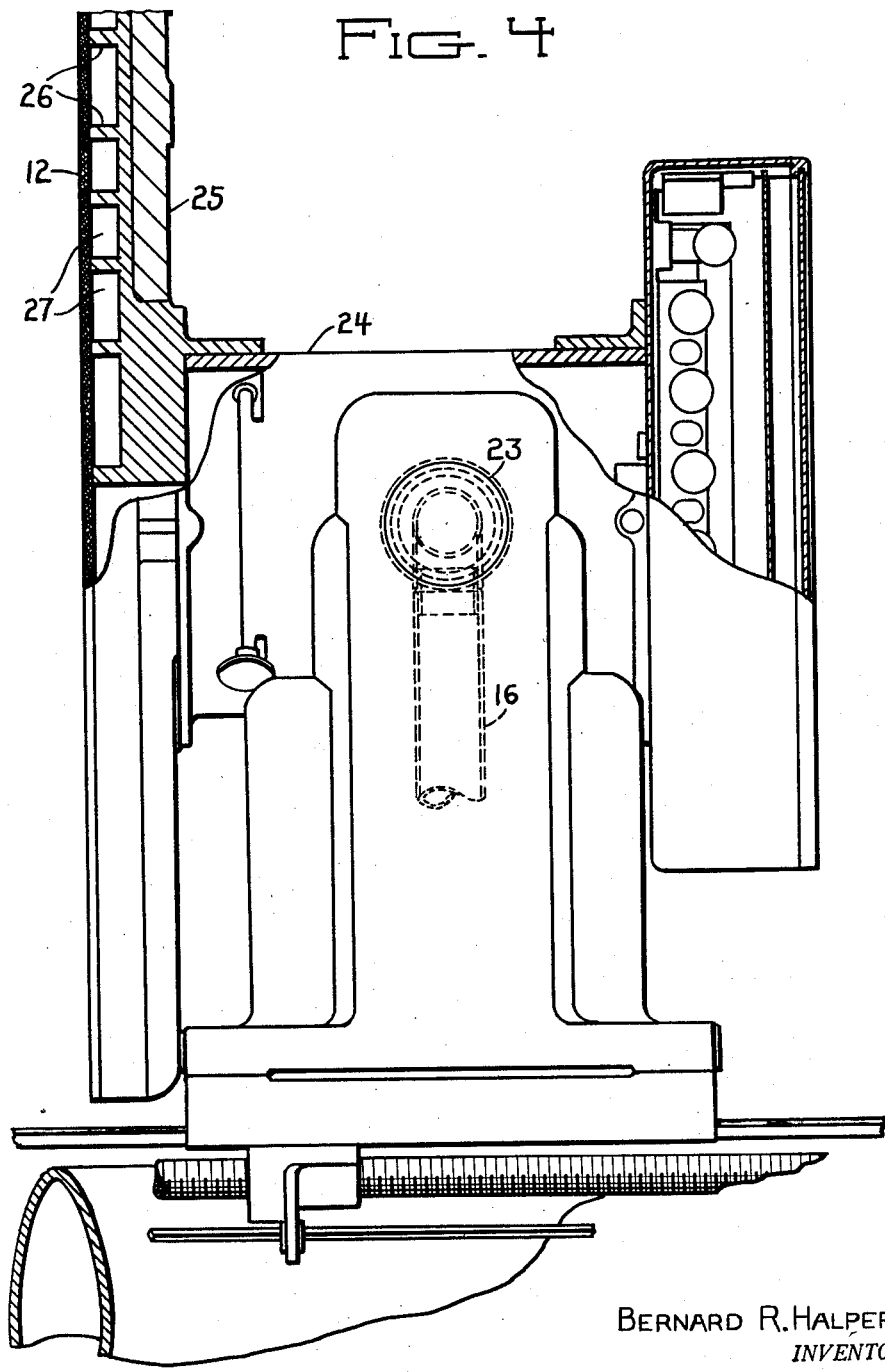

Patented July 14, 1953

2,645,153

UNITED STATES PATENT OFFICE 2,645,153

OPTICALLY TRUE SUPPORT FOR PHOTOGRAPHIC FILM, COPY, OR OTHER MATERIAL

Bernard R. Halpern, New York, N. Y.

Original application December 13, 1947, Serial No. 791,515, now Patent No. 2,570,668, dated October 9, 1951. Divided and this application September 12, 1950, Serial No. 184,486

1 Claim. (Cl. 88—24)

The invention herein disclosed relates to the supporting of photographic film, copy material and the like and is a division of patent application Serial No. 791,515, filed December 13, 1947, now Patent No. 2,570,668, dated October 9, 1951.

The general objects of the invention are to provide a support which will hold photographic film, material for copy and the like, physically and optically flat and true for photographic, inspection, registration or other purposes and which will be economical as well as entirely practical in character.

Particular objects of the invention are to provide an efficient support of this nature for use in the camera backs, copyboards and transparency holders of precision process cameras.

Further special objects of the invention are to provide a suction type holder for small or large size film or copy which will automatically grasp and securely retain such material in selected position in an optically flat, non-deforming plane, without the use of cover glass or film or perforations or grooves such as have been used in the past and which necessarily produce optical or physical distortion of the photographic plane.

Basically the invention involves the use of a suction plate porous in character and composed of granular or fibrous matter bonded either naturally or synthetically in a structure incorporating myriad cells and interstices of microscopic dimensions and through the medium of which substantially uniform adhesion is accomplished over microincrements of the entire supporting surface.

Allied objects of the invention are to provide a substantially permanent, non-warping suction member that will not deform negatives or other materials even though of light, flimsy character, adhered to its surface.

Other desirable objects attained by the invention and the various novel features through which the purposes of my invention are accomplished are set forth or will appear in the course of the following specification.

The drawings accompanying and forming part of the specification are illustrative of certain present preferred embodiments of the invention. Details, however, may be modified and changed as regards the immediate illustration, all within the true intent and broad scope of the invention as hereinafter defined and claimed.

Fig. 1 in the drawings is a side elevation of a precision camera having the invention incorporated therein;

Fig. 2 is an elevation of the camera back end of such apparatus, with parts appearing in section;

Fig. 3 is an enlarged broken sectional detail as on substantially the plane of line 3—3 of Fig. 2, showing in particular the porous back suction plate;

Fig. 4 is a part sectional broken view of the copyboard and transparency holder.

The process camera illustrated is shown as comprising an upright camera back 7, and adjustable upright lens-board 8 and an upright adjustable copyboard 9 and transparency holder 10.

In this particular disclosure both the camera back and the copyboard are equipped with vacuum backs for holding negative film in the one case and copy material in the other case, with pumps and appropriate connections for applying the suction.

In each instance the vacuum back consists of a vertically disposed, optically flat, porous suction plate or board, designated 11 in the camera back and 12 in the copyboard.

These plates may be of porous stone or metal.

As a practical matter they may be produced by compressing a mixture of granular material such as Carborundum, sand, metal filings or crushed and screened stone of a relatively fine particle size combined with resin or other suitable binder, within a mold under heat and pressure to effect adherence of the granules in a porous structure having fine interstices extending entirely therethrough. Because of the fine grain and substantially uniform porosity obtained, a resin bonded, No. 56 silicon carbide screened grain plate has been used to advantage.

This example, however, is to be considered illustrative since a coarser or finer grained structure is practical and, in fact, the grain and pore sizes may vary both ways from the example given.

Natural porous materials as well as sintered or self-bonding, granular particles under pressure may also be used.

Suction is applied in each instance, in the illustration, by a motor driven suction blower 13, 14, connected by hose 15, 16, with the vacuum back enclosures.

At the camera back the hose 15 is shown connected with a vacuum chest 17 on the front of the vacuum back frame 18.

To zone the board for different size negatives, walls or flanges 19 are shown in Figs. 2 and 3, of compressible rubber or non-resilient material pressed against the back of the porous plate and defining suction chambers 20 of gradually increasing size and which can be cut into and out of service by a rotary valve 21 on the suction chest 17 controlling bores or passages 22 leading to the successive chambers.

At the copyboard the suction hose 16 is shown connected with the journal portion 23 of the tubular vacuum reservoir 24 on which the base or back 25 of the copyboard is mounted. This supporting back plate is shown as having walls 26 in back of the porous suction plate 12 defining successively larger vacuum chambers 27, controllable by suitable valve mechanism.

The present invention avoids entirely the objectionable features of previous suction supports using either a covering glass or system of grooves or perforations to exhaust the air. The glass covering form introduces an additional optical medium causing refractions as well as minute defects from adhering dust or scratches, and the grooved and perforated supports draw thin negative or other material into the depressions, distorting the physical as well as the optical plane, with resultant "ghost" image appearing on the negative, particularly in process halftone negatives. In addition, the older grooved and perforated members limit the vacuum suction to the immediate vicinity of the grooves or holes, so that odd shaped films or drawings other than standard sizes for which a suction member may have been made will not adhere adequately without supplemental masking, taping or a covering sheet of glass or plastic.

The present invention provides a hard, optically smooth and flat, vertically disposed supporting surface which is substantially uniformly porous throughout and with interstices of such minute size as to exert no localized deforming effect on the film, paper or other material supported, even though that material be of a thin, flimsy character such as tissue.

While optically smooth, the porous surface is constituted of microscopic granular elements which in themselves have a holding frictional engagement with the supported material.

By pressing in a smooth, accurately finished mold, the porous suction plate can be produced at relatively low cost since expensive machining and other finishing operations are avoided.

The suction plate may be formed to curved or three-dimensional surface to hold materials or objects for special photographic, engraving or other purposes. Because of the non-distorted and non-distorting porous surface, drawing materials may be held physically flat for drafting, scribing or inking for hand drafting or machine recording, without the defects occasioned by surface irregularities resulting from the non-supporting perforations or grooves in the older types of suction plates.

What is claimed is:

A vacuum back for holding and supporting film or copy material in optically smooth, vertical position in a precision process camera or the like, comprising film or paper holding structure having a suction chest enclosure over the back of the same, means for applying suction to said enclosure, a suction plate covering the front of said suction chest enclosure and having a continuous, flat, smooth front supporting surface and continuous suction over the entire area of the same, said suction plate composed of fine granular material closely and rigidly bonded together in a hard, rigid, self-supporting, porous, homogeneous structure having immediately adjoining, microscopically minute channels extending through the same from the supporting surface at the front to the back surface of the plate, said front supporting surface of the plate being uninterruptedly smooth and optically flat and said minute channels having immediately adjoining terminal ports of microscopic size, in the plane of said optically flat supporting surface, and continuously and uniformly distributed over the entire area of the plate whereby to hold and support flexible film or copy material in optically flat, undistorted condition.

BERNARD R. HALPERN.

References Cited in the file of this patent
UNITED STATES PATENTS

| Number | Name | Date |
|---|---|---|
| 1,062,579 | Aylsworth | May 27, 1913 |
| 2,379,279 | Costello | June 26, 1945 |
| 2,467,172 | Wheeler | Apr. 12, 1949 |